United States Patent [19]

Kashiwai

[11] Patent Number: 4,540,062
[45] Date of Patent: Sep. 10, 1985

[54] REAR WHEEL SUPPORTING SYSTEM FOR MOTORCYCLE

[75] Inventor: Mikio Kashiwai, Saitama, Japan

[73] Assignee: Honda Giken Kogyo Kabushiki Kaisha, Tokyo, Japan

[21] Appl. No.: 541,835

[22] Filed: Oct. 14, 1983

[30] Foreign Application Priority Data

Oct. 14, 1982 [JP] Japan .................. 57-180395

[51] Int. Cl.$^3$ .................. B62K 25/04
[52] U.S. Cl. .................. 180/227; 180/231; 267/150; 280/288; 384/247; 474/116
[58] Field of Search .......... 180/219, 218, 227, 231, 180/217; 280/268, 271, 275, 283, 284, 285, 286, 288; 74/396, 397, 392; 267/150; 474/101, 113, 116; 384/247, 249, 250, 252, 253, 260

[56] References Cited

U.S. PATENT DOCUMENTS

| 1,720,423 | 7/1929 | Masury | 474/116 X |
| 2,164,413 | 7/1939 | Kuehn | 180/227 |
| 2,488,892 | 11/1949 | Arzt | 180/231 X |

Primary Examiner—Joseph F. Peters, Jr.
Assistant Examiner—Mitchell J. Hill
Attorney, Agent, or Firm—Armstrong, Nikaido, Marmelstein & Kubovcik

[57] ABSTRACT

A rear wheel supporting system for a motorcycle wherein an end portion of a rear axle—which is supported by the rear end portions of a rear fork—on the side opposite to the side where a rear wheel driving means is disposed, is supported so as to be movable resiliently in the longitudinal direction of the vehicle body.

6 Claims, 7 Drawing Figures

REAR WHEEL SUPPORTING SYSTEM FOR MOTORCYCLE

BACKGROUND OF THE INVENTION

1. Field of the Invention

The present invention relates to a rear wheel supporting system for a motorcycle and more particularly to a rear wheel supporting system for a motorcycle capable of preventing the occurrence of wobble.

2. Description of Relevant Art

In general, there occurs wobble (vibrations about a steering shaft) during a high-speed running of a motorcycle. It is known that wobble is influenced by dynamic characteristics of front and rear wheels, particularly of a rear wheel. It is also known that the variation in dynamic characteristics of front and rear wheels of a vehicle, especially of a rear wheel, does not affect the weave mode (vibration mode on a frequency of 4 Hz or so which varies with vehicular speeds) so greatly, but greatly affects the wobble mode (vibration mode at a frequency of 10 Hz or so which scarcely changes even if the vehicular speed changes).

On this regard, conventional rear wheel supporting systems for motorcycles comprise a rear fork whose front end of which is connected to a body frame vertically pivotably through a pivot shaft, a damper disposed between the rear fork and the body frame for supporting the rear fork in a suspended state, a wheel axle which is supported by the rear end of the rear fork, and a rear wheel mounted on the wheel axle so as to be rotatable integrally with a drive member such as a driven sprocket. The rear wheel has a freedom only in an arcuate direction around the pivot shaft of the rear fork. And this arcuate motion of the rear wheel is absorbed and cushioned by the damper.

In such construction of conventional rear wheel supporting systems, however, there inevitably occurs wobble during a high-speed running of the motorcycle, as previously noted, thus deteriorating the driving feeling in such a running condition.

The present invention has been accomplished for overcoming the above-mentioned problem of the conventional rear wheel supporting systems for motorcycles.

Particularly, the present invention is based on the consideration that vibrations of the rear wheel in the longitudinal direction of the vehicle body approximately perpendicular to vertical vibrations of the rear wheel which is to be absorbed by the damper are transmitted to the steering shaft through the rear fork and the vehicle body frame without being absorbed by the damper, thus resulting in the occurrence of wobble about the steering shaft.

SUMMARY OF THE INVENTION

According to the present invention, there is provided a rear wheel supporting system for a motorcycle which system comprises a rear fork, the rear fork having a front end portion connected vertically pivotably to a body frame and at least right and left members extending rearwards from the said front end portion; a rear axle having end portions respectively supported by the rear end portions of the right and left members of the rear fork; a rear wheel driving means for driving a rear wheel which is mounted rotatably on the rear axle, the rear wheel driving means being mounted on the rear axle on one side of the rear wheel; and a rear wheel damping means disposed between the rear fork and the body frame, wherein a first end portion of the rear axle on the side of the rear wheel driving means is supported fixedly by one of the right and left members of the rear fork, and a second end portion of the rear axle on the side opposite to the first end portion is supported by the other member of the rear fork resiliently movably in the longitudinal direction of the vehicle body through a resilient support means.

It is an object of the present invention to provide a rear wheel supporting system for a motorcycle capable of effectively preventing the occurrence of wobble about a steering shaft during a high-speed running of the motorcycle.

Preferred embodiments of the present invention will be described in detail hereinunder with reference to the accompanying drawings, from which further features, objects and advantages of the invention will become apparent.

DETAILED DESCRIPTION OF PREFERRED EMBODIMENTS

Figure 1:
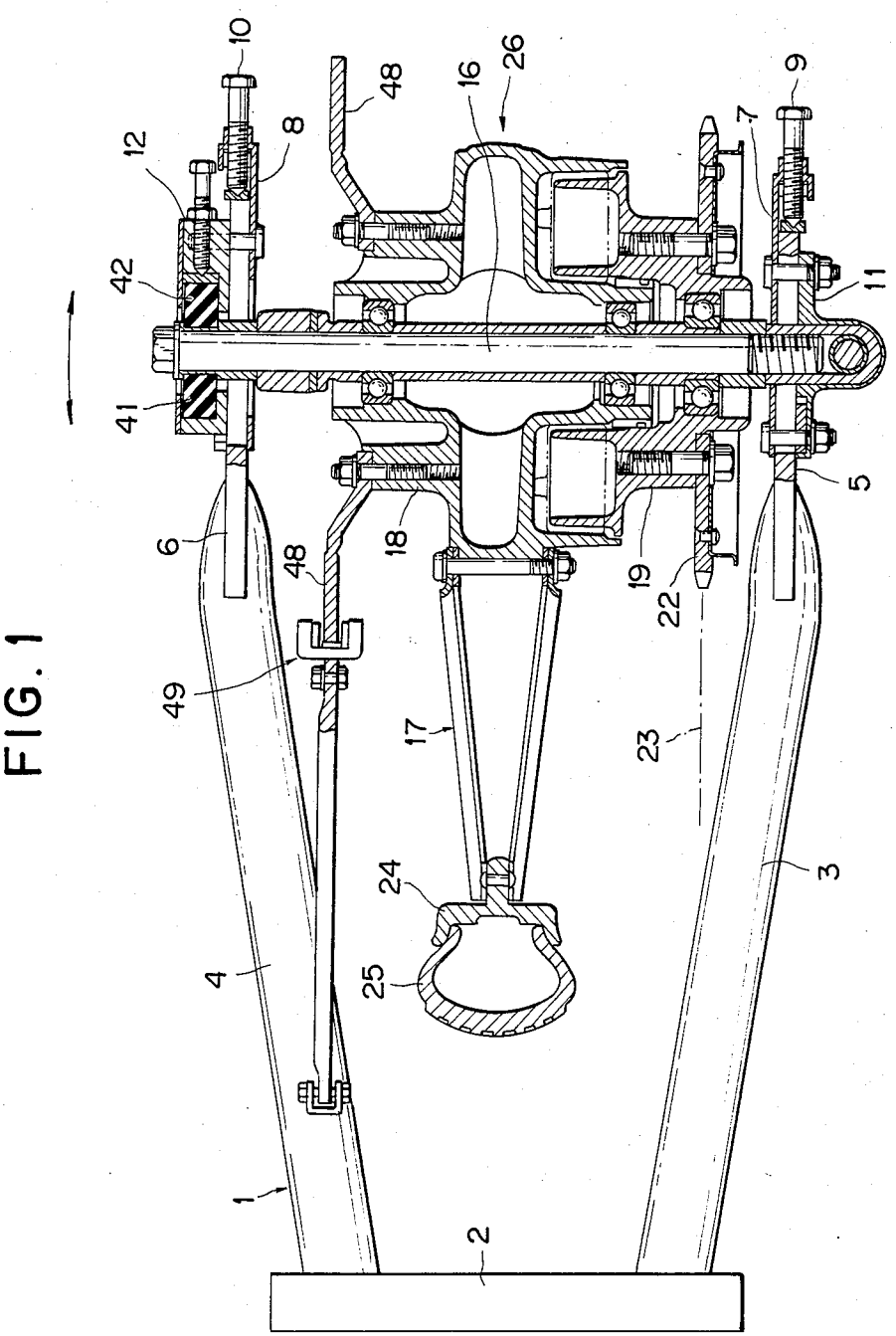
FIG. 1 is a sectional view of a rear wheel supporting system according to a first embodiment of the present invention.
Figure 2:
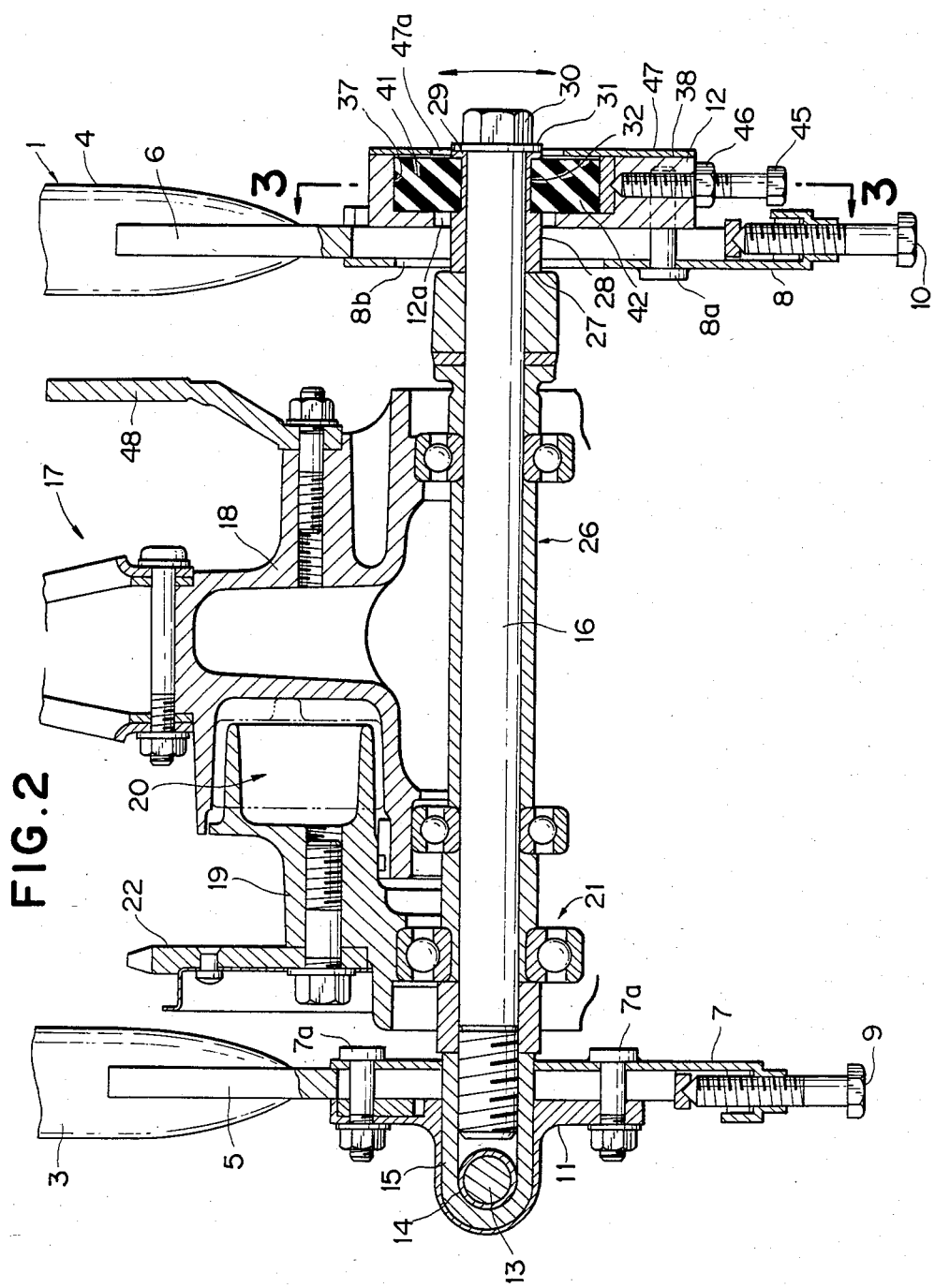
FIG. 2 is an enlarged view of a principal portion of FIG. 1.

Referring to FIGS. 1 and 2, the reference numeral 1 denotes a rear fork having a front end portion 2 which is connected to the body frame side vertically pivotably through a pivot shaft, the rear fork 1 being supported in a suspended condition by two dampers (not shown) disposed between the rear fork 1 and a body frame.

The rear fork 1 is further provided with a left member 3 and a right member 4 respectively having end pieces 5 and 6. To the end pieces 5 and 6 are attached axle holders 11 and 12 horizontally adjustably through chain adjusting plates 7 and 8, and through chain adjusting bolts 9 and 10, respectively. Axle holders 11 and 12 are fixedly connected to the adjusting plates 7 and 8 by means of bolts 7a and 8a, respectively.

In the left-hand axle holder 11 is incorporated an axle joint 15 through a connecting pin 13 and a bush 14. The axle joint 15 has an internally threaded portion which is engaged with an externally threaded portion formed at the left end of a wheel axle 16.

A hub portion 18 of a rear wheel 17 is mounted rotatably and axially unmovably on an intermediate portion of the wheel axle 16. Further, a driven flange 19 is mounted on the rear axle 16 in a position close to the left-hand axle holder 11 through a bearing 21 so that it can drive the rear wheel 17 through a one-way clutch 20.

To the driven flange 19 is fixed a driven sprocket 22, on which is wound a driving chain 23 adapted to be rotated by a driving mechanism (not shown). A rear tire 25 is mounted on a rim portion 24 of the rear wheel 17.

A collar 28 is fitted on the right end of the wheel axle 16 so that its left end face 27 abuts the right end face of a collar group 26 fitted on an intermediate portion of the wheel axle 16. A right end portion 29 of the collar 28 is tightly secured to the right-hand axle holder 12 through a head bolt portion 30 and washer portion 31 of the wheel axle 16. The collar 28 has a reduced-diameter portion 32 in a position close to its right end portion 29.

Figure 3:
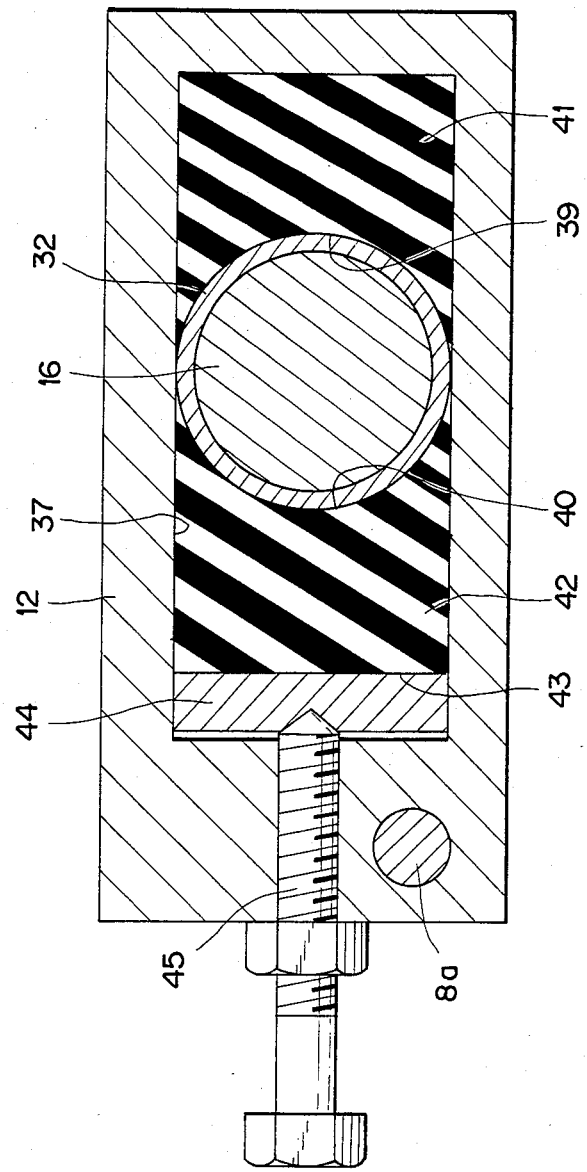
FIG. 3 is a sectional view taken along line 3—3 in FIG. 2.

In the right-hand axle holder 12, as shown in FIG. 2 and FIG. 3 which illustrates a resilient support means, is formed a recessed portion 37 in the shape of an oblong rectangle when viewed sideways so that its opening portion is located on the side of a right end face 38 of the holder 12. The recessed portion 37 has a height which supports the reduced-diameter portion 32 of the collar 28 vertically unmovably, and it extends by a required length in the horizontal direction.

In the recessed portion 37 are inserted a front damper rubber 41 and a rear damper rubber 42 before and behind the reduced-diameter portion 32 so that the respective opposed faces 39 and 40 are in conformity with the contour of the reduced-diameter portion 32. Further, an adjusting plate 44 is inserted on the side of a rear end face 43 of the rear damper rubber 42. The adjusting plate 44 is made movable in the longitudinal direction by means of a damper adjusting bolt 45 which is threadedly attached to the rear end portion of the right-hand axle holder 12 and a lock nut 46 so that the hardness, namely, the damping force characteristic, of the front damper rubber 41 and that of the rear damper rubber 42 can be adjusted.

A damper cover 47 is attached to the right end face 38 of the right-hand axle holder 12 for preventing the front and rear damper rubbers 41 and 42 from coming off the recessed portion 37. The cover 47 is formed with an elliptic opening 47a which permits the right end portion of the axle 16 to move in the longitudinal direction of the vehicle body. Also in the adjusting plate 8 is formed an elliptic opening 8b.

The reference numerals 48 and 49 in FIG. 1 denote a rear brake disc and a rear brake caliper, respectively.

Thus, in the above first embodiment, one end of the rear axle 16 is fixed to one member of the rear fork 1 and the other end thereof is connected to the other member of the rear fork 1 movably in the longitudinal direction of the vehicle body through the damper rubbers 41 and 42. Consequently, the rear wheel 17 is not only vertically pivotable about the pivot shaft of the front end portion 2 of the rear fork but also movable in the longitudinal direction of the vehicle body. Therefore, vertical and horizontal vibrations of the rear wheel 17 during a high-speed running of the motorcycle are absorbed and cushioned respectively by the damper and the damper rubbers 41 and 42, thereby preventing the occurrence of wobble.

Moreover, since the end of the wheel axle 16 on the side where the driven sprocket 22 is mounted is fixed to the rear fork 1 and the damper rubbers 41 and 42 are provided at the end of the wheel axle 16 on the side opposite to the driven sprocket 22 side, the freedom of the wheel axle 16 in the horizontal direction through the damper rubbers 41 and 42 does not affect the rear wheel driving system including the driven sprocket 22.

Further, since the freedom of the wheel axle 16 is given only in the horizontal direction through the damper rubbers 41 and 42 and the wheel axle 16 is fixedly supported in the vertical direction, the tire does not undergo a change in its dynamic characteristic.

Figure 4:
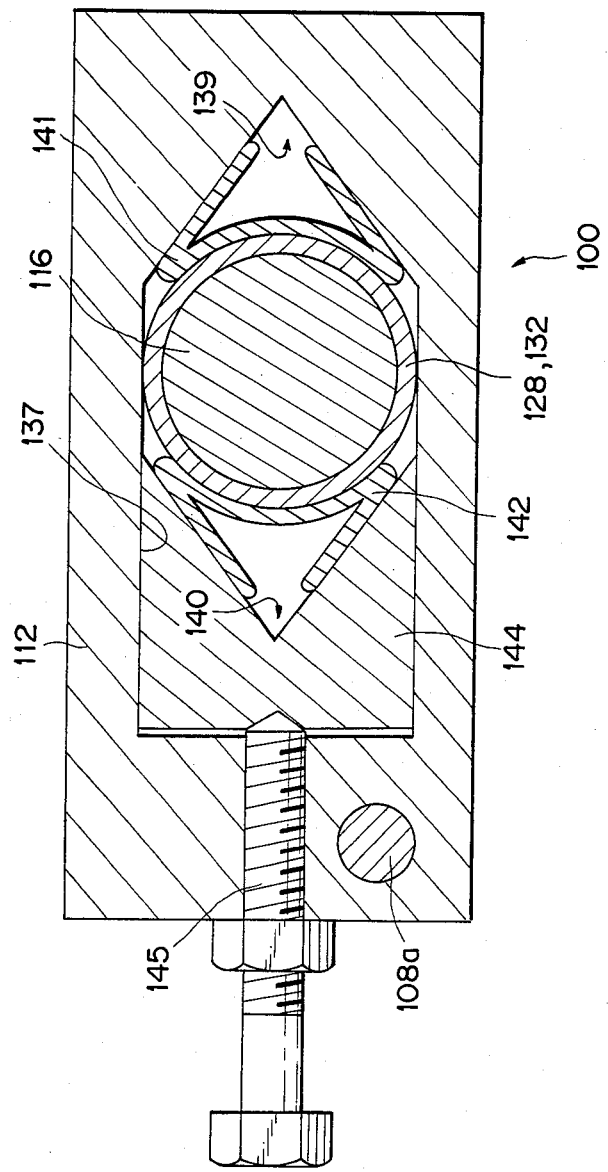
FIG. 4, which is similar to FIG. 3, is a sectional view of a principal portion of a rear wheel supporting system according to a second embodiment of the present invention.

Referring now to FIG. 4, there is shown a resilient support means for a rear axle in a rear wheel supporting system according to a second embodiment of the present invention. The other components of the rear wheel supporting system than the resilient support means are the same in structure as those described in the above first embodiment, so their illustrations and explanations will be omitted.

In FIG. 4, a resilient support means 100 comprises a rear axle holder 112; leaf spring 141 and 142 of a generally triangular shape which are inserted in a recessed portion 137 formed in the holder 112 and which resiliently support a reduced-diameter portion 132 of a collar 128 with a rear axle 116 being inserted and supported in the interior of the collar; an adjusting plate 144 for adjustitng the resilient force of those leaf springs; and an adjusting bolt 145 for the adjusting plate 144.

The recessed portion 137, as shown in the figure, is provided at its front portion with a front wall 139 of an acute angle for retaining the leaf spring 141 and is provided at an intermediate portion thereof with a parallel portion which permits only longitudinal movements of the reduced-diameter portion 132 of the collar. The parallel portion extends rearwardly of the vehicle body for insertion therein of the adjusting plate 144 movably. The adjusting plate 144 has an abutting surface 140 formed substantially in conformity with the shape of the leaf spring 142 for retaining the leaf spring 142. Further, the portions of the leaf springs 141 and 142 which are in abutment with the reduced-diameter portion 132 of the collar are shaped in conformity with the contour of the reduced-diameter portion 132. The numeral 108a in the figure denotes a bolt for adjusting the position of the holder 112.

The above-described construction of the resilient support means permits an effective pvevention of the occurrence of wobble around the steering shaft during a high-speed running of the motorcycle, like the previous first embodiment.

Also in this second embodiment, like the first embodiment, the resilient support means is disposed for supporting the end of the rear axle on the side opposite to the side where the rear wheel driving mechanism is provided. This is also the case with the following embodiments.

Figure 5:
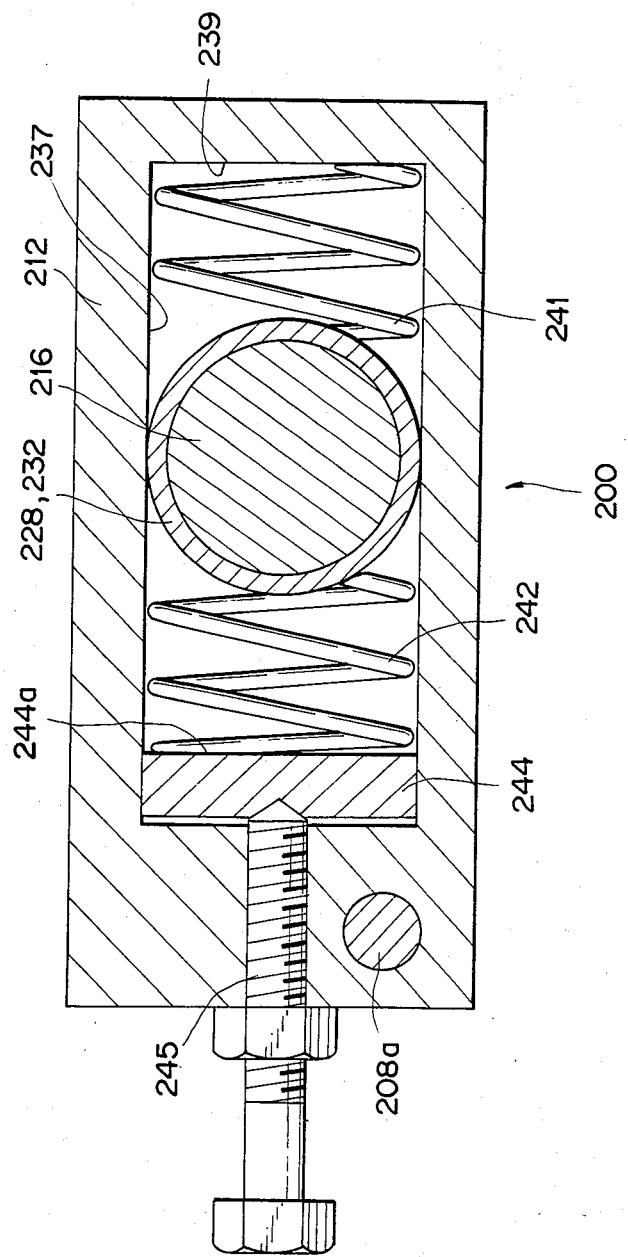
FIG. 5 is a sectional view of a principal portion of a rear wheel supporting system according to a third embodiment of the present invention.

Referring now to FIG. 5, there is shown a resilient support means for a rear axle in a rear wheel supporting system according to a third embodiment of the present invention, in which a resilient support means 200 comprises a rear axle holder 212; coil springs 241 and 242 which are inserted in a recessed portion 237 formed in the holder 212 and which resiliently support a reduced-diameter portion 232 of a collar 228 with a rear axle 216 being inserted and supported in the interior of the collar; an adjusting plate 244 for adjusting the resilient force of those coil springs; and an adjusting bolt 245 for the adjusting plate 244. As shown in the figure, the recessed portion 237 has a generally rectangular side and has a height which permits only longitudinal movements of the reduced diameter portion 232. The coil spring 241 is disposed in a compressed state between a front inner wall 239 of the concave portion 237 and the reduced-diameter portion 232 of the collar, while the coil spring 242 is disposed in a compressed state between a front face 244a of the adjusting plate 244 and the reduced-diameter portion 232. The numeral 208a in the figure denotes a bolt for adjusting the position of the holder 212. Such a construction affords the same effect as in the foregoing embodiments.

Figure 6:
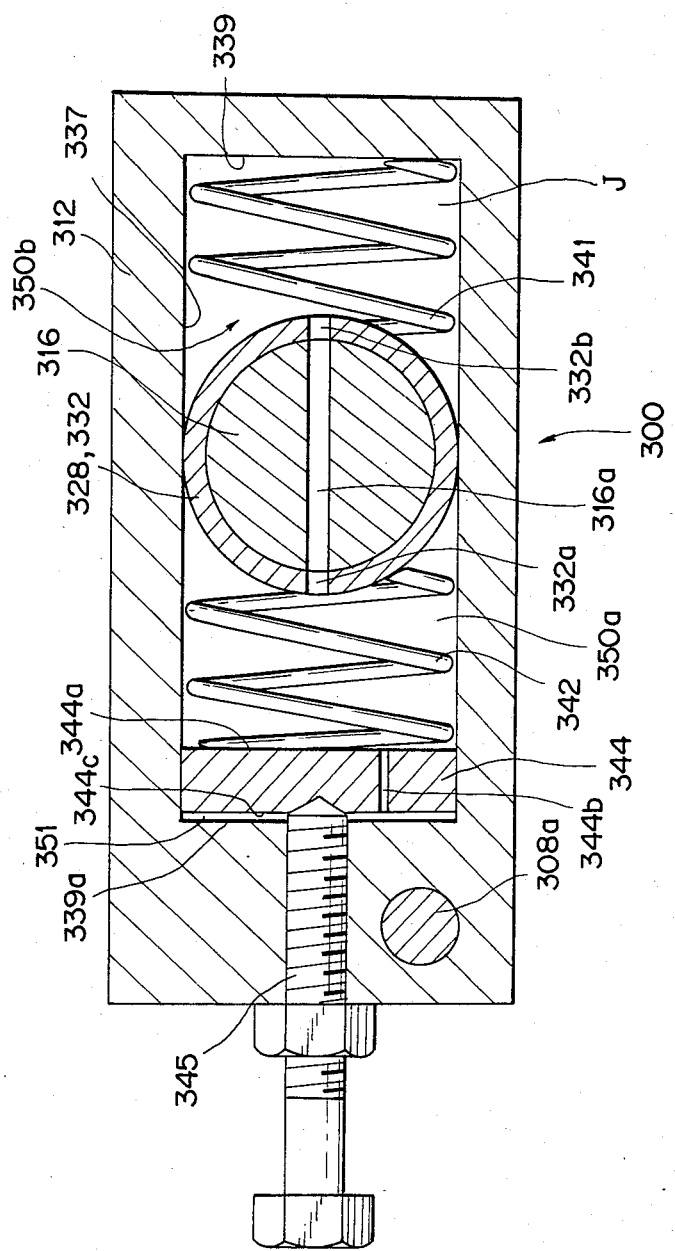
FIG. 6 is a sectional view of a principal portion of a rear wheel supporting system according to a fourth embodiment of the present invention.

Referring now to FIG. 6, there is illustrated a resilient support means for a rear axle in a rear wheel supporting system according to a fourth embodiment of the present invention, in which, like the embodiment of FIG. 5, a resilient support means 300 is provided with a rear axle holder 312; coil springs 341 and 342 which are disposed within a recessed portion 337 formed in the holder 312 and which resiliently support a reduced-diameter portion 332 of a collar 328 with a rear axle 316 being inserted and supported in the interior of the collar; an adjusting plate 344 for adjusting the resilient force of those coil springs; and an adjusting bolt 345. As shown in the figure, the recessed portion 337 has a generally rectangular side and has a height which permits only longitudinal movements of the reduced-diameter portion 332. The coil spring 341 is disposed in a compressed state between a front inner wall 339 and the reduced-diameter portion 332 of the collar, while the coil spring 342 is disposed in a compressed state between a front face 344a of the adjusting plate 344 and the reduced-diameter portion 332.

In this fourth embodiment, moreover, orifices 316a and 332a, 332b are formed respectively in the rear axle 316 and the reduced-diameter portion 332 of the collar so as to give a single orifice extending substantially in the longitudinal direction of the vehicle body. Also in the adjusting plate 344 is formed an orifice 344b thereby communicating a chamber 350a which is defined by the rear face of the reduced-diameter portion 332, a part of the recessed portion 337 and the front face 344a of the adjusting plate 344, with a chamber 351 which is formed betwen the rear face of the recessed portion 337 and a rear face 344c of the adjusting plate 344. The interiors of a chamber 350b which is defined by the front inner wall 339 of the recessed portion 337, a part of the concave portion 337 and the front face of the reduced-diameter portion 332, the orifices 332b, 316a and 332a, the chamber 350a, the orifice 344b and the chamber 351, are filled with oil J in an oil-tightly sealed condition from the exterior. The oil J is in communication with an oil sump (not shown). The numeral 308a in the figure denotes a bolt for adjusting the position of the holder 312.

In such construction, vibrations of the rear axle 316 in the longitudinal direction of the vehicle body are effectively absorbed by the resilient force of the coil springs 341 and 342 and the flow path resistances of the orifices 332b, 316a and 332a. Thus, the same effect as in the previous embodiments is obtained. In this embodiment, moreover, since the degree of shock induced by longitudinal vibrations of the rear axle to be absorbed by the coil springs is smaller than that in the use of rubber or leaf spring in the previous embodiments, the resilient force of the coil springs can be adjusted more easily.

Figure 7:
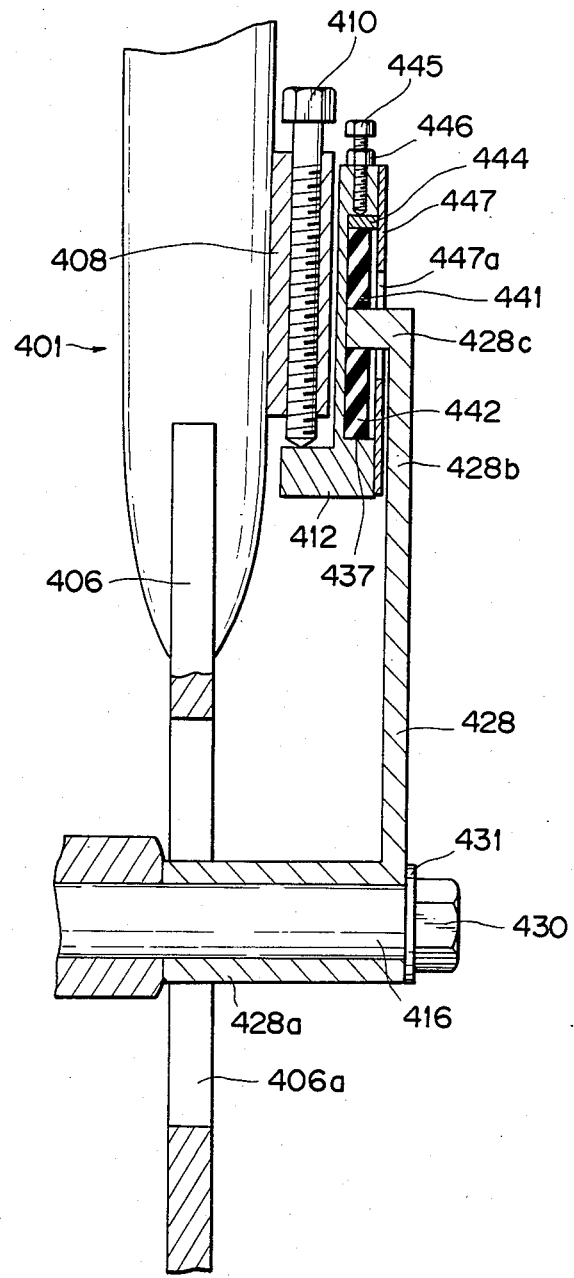
FIG. 7 is a sectional view of a rear wheel supporting system according to a fifth embodiment of the present invention.

Referring now to FIG. 7, there is illustrated a rear wheel supporting system according to a fifth embodiment of the present invention, in which the right end portion of a rear axle 416 extends to the right as shown through an opening 406a formed in an end piece 406 at the rear end of a right member of a rear fork 401. A collar 428 is fitted over the rear axle 416 and it is fixed onto the rear axle by means of a bolt 430 and a washer 431. The opening 406a is in the form of an ellipse which permits movements of a cylindrical portion 428a of the collar only in the longitudinal direction of the vehicle body. The collar 428 is provided with an extension 428b which extends forwardly of the vehicle body and is further provided at the fore end portion of the extension 428b with a cylindrical protrusion 428c which projects leftwards at an approximately right angle. The protrusion 428c is inserted in a substantially intermediate part in the longitudinal direction of a recessed portion 437 which is formed in a holder 412. The holder 412 is adjusted its position by an adjusting bolt 410 threadedly inserted in an adjusting plate 408, the adjusting plate 408 being fixed to the rear fork 401. The recessed portion 437 has a rectangular side which permits movements of the protrusion 428c only in the longitudinal direction of the vehicle body.

Further, like the first embodiment shown in FIG. 3 damper rubbers 441 and 442 and an adjusting plate 444 are disposed within the recessed portion 437. And a cover plate 447 is attached to the right face of the holder 412 for preventing the damper rubbers 441 and 442 from coming off the recessed portion 437. In the cover plate 447 is formed an opening 447a which permits only longitudinal movements of the protrusion 428c. The adjusting plate 444 is adjusted its longitudinal position by means of a damper adjusting bolt 445 which is threadedly attached to the fore end portion of the holder 412 and a lock nut 446 which is for fixing the bolt 445. By this adjustment of the position of the adjusting plate 444, the damping force characteristics of the damper rubbers 441 and 442 are adjusted.

In such construction, vibration of the rear axle 416 in the longitudinal direction are transmitted to the protrusion 428c through the extension 428b of the collar 428 and absorbed by the damper rubbers 441 and 442. Thus, the same effect as in the previous embodiments is obtained.

In the foregoing first to fourth embodiments, the resilient support means may be constructed so that a frictional force is induced between the reduced-diameter portion of the collar fitted on the right end of the rear axle and the upper and lower faces of the concave portion. Moreover, even if only one rubber or spring is disposed either before or behind the reduced-diameter portion of the collar, it is possible to prevent the occurrence of wobble.

Further, in the foregoing fifth embodiment, vibrations of the rear axle in the longitudinal direction of the vehicle body may be absorbed by using such springs or the combination of springs and oil as shown in any of FIGS. 4 through 6 in place of the rubber.

What is claimed is:

1. A rear wheel supporting system for a motorcycle, including a frame, comprising:
    a rear fork having a front end portion connected vertically pivotably to said frame and at least right and left members extending rearwards from said front end portion;
    a rear axle having end portions respectively supported by the rear end portions of said right and left members of said rear fork;
    a rear wheel driving means for driving a rear wheel which is mounted rotatably on said rear axle, said rear wheel driving means being mounted on said rear axle on one side of rear wheel; and a rear wheel damping means disposed between said rear fork and said rear axle, wherein:

a first end portion of said rear axle on the side of said rear wheel driving means is supported fixedly by one of said right and left members of said rear fork, and a second end portion of said rear axle on the opposite side to said first end portion is supported by the other member of said rear fork resiliently movably in the longitudinal direction of the motorcycle frame through a resilient support means;

said resilient support means comprising:

a collar fitted on said second end portion of said rear axle;

an axle holder connected to said rear fork, said axle holder having a recessed portion so formed as to permit movements of said collar only in the longitudinal direction of the motorcycle frame, said recessed portion having upper and lower inner faces extending substantially in parallel with each other in the longitudinal direction of said frame, said collar being disposed within said recessed portion; and resilient means including at least one leaf spring disposed in a compressed state respectively between a front face of said concave portion and a front face of said collar and between a rear face of said recessed portion and a rear face of said collar.

2. A rear wheel supporting system according to claim 1, wherein said resilient means comprises at least one coil spring.

3. A rear wheel supporting system according to claim 2, wherein said second end portion of said rear axle and said collar have at least one orifice within said recessed portion, said orifice extending through both said second end portion of said rear axle and said collar so as to connect between a chamber defined between the front face of said recessed portion and the front face of said collar and a chamber defined between the rear face of said collar and the rear face of said recessed portion, both said chambers being sealed from the exterior in an oil-tight manner and filled with oil.

4. A rear wheel supporting system according to claim 1, wherein said resilient means comprises at least one resilient rubber member.

5. A rear wheel supporting system according to claim 1, wherein said resilient support means is fixed to said the other member of both said members of said rear fork, and wherein a rear axle collar having an extension forwardly extending substantially in the longitudinal direction of the vehicle body is fitted on said second end portion of said rear axle, the front end portion of said extension being supported by said resilient support means resiliently movably in the longitudinal direction of the vehicle body.

6. A rear wheel supporting system according to claim 1, wherein the resilient force of said resilient means is adjustable.

* * * * *